United States Patent
Thubert et al.

(10) Patent No.: US 9,479,421 B2
(45) Date of Patent: Oct. 25, 2016

(54) DYNAMIC INSTALLATION OF LOCAL STORING MODE PATHS IN A NON-STORING LOW-POWER AND LOSSY NETWORK

(71) Applicant: Cisco Technology, Inc., San Jose, CA (US)

(72) Inventors: Pascal Thubert, La Colle Sur Loup (FR); Jean-Philippe Vasseur, Saint Martin d'Uriage (FR); Patrick Wetterwald, Mouans Sartoux (FR); James Pylakutty Mundenmaney, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 154 days.

(21) Appl. No.: 14/482,571

(22) Filed: Sep. 10, 2014

(65) Prior Publication Data

US 2016/0072697 A1   Mar. 10, 2016

(51) Int. Cl.
| | |
|---|---|
| H04L 12/28 | (2006.01) |
| H04L 12/751 | (2013.01) |
| H04L 12/24 | (2006.01) |
| H04W 40/24 | (2009.01) |
| H04L 12/753 | (2013.01) |
| H04W 84/18 | (2009.01) |
| H04L 12/721 | (2013.01) |

(52) U.S. Cl.
CPC ............ *H04L 45/025* (2013.01); *H04L 41/12* (2013.01); *H04L 45/02* (2013.01); *H04L 45/48* (2013.01); *H04W 40/24* (2013.01); *H04L 45/14* (2013.01); *H04L 45/34* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 7,366,111 | B2 | 4/2008 | Thubert et al. |
| 7,428,221 | B2 | 9/2008 | Thubert et al. |
| 7,656,857 | B2 | 2/2010 | Thubert et al. |
| 7,693,064 | B2 | 4/2010 | Thubert et al. |
| 7,778,235 | B2 | 8/2010 | Thubert et al. |
| 7,860,025 | B2 | 12/2010 | Thubert et al. |
| 7,885,274 | B2 | 2/2011 | Thubert |
| 2011/0116389 | A1* | 5/2011 | Tao .................. H04L 45/18 370/252 |
| 2011/0231573 | A1* | 9/2011 | Vasseur ............. H04L 45/48 709/238 |
| 2012/0117208 | A1* | 5/2012 | Shaffer ............. H04L 29/12254 709/221 |

(Continued)

OTHER PUBLICATIONS

Thubert, Ed., et al., "An Architecture for IPv6 over the TSCH mode of IEEE 802.15.4e", Jul. 4, 2014, [retrieved on Dec. 11, 2015]. Retrieved from the Internet: <URL: https://tools.ietf.org/html/draft-ietf-6tisch-architecture-03>, pp. 1-30.

(Continued)

*Primary Examiner* — Otis L Thompson, Jr.
(74) *Attorney, Agent, or Firm* — Leon R. Turkevich

(57) ABSTRACT

In one embodiment, a method comprises identifying, by a network device operating in a network topology as a directed acyclic graph (DAG) root, a source-route path for reaching a destination device in the network topology; determining whether one or more parent devices along the source-route path between the network device and the destination device are capable of storing a route entry specifying routing information for reaching the destination device; and causing installation of a route entry for reaching the destination device in one or more of the parent devices determined as capable of storing the corresponding route entry.

20 Claims, 4 Drawing Sheets

(56) References Cited

U.S. PATENT DOCUMENTS

| | | | | |
|---|---|---|---|---|
| 2012/0307652 A1* | 12/2012 | Vasseur | .................. | H04L 45/74 370/252 |
| 2013/0010798 A1* | 1/2013 | Shaffer | ................ | H04L 12/569 370/395.42 |
| 2014/0126423 A1* | 5/2014 | Vasseur | .................. | H04L 45/48 370/255 |
| 2015/0341167 A1* | 11/2015 | Gregory | ............... | H04L 9/0822 380/281 |

OTHER PUBLICATIONS

Vasseur, "Terms Used in Routing for Low-Power and Lossy Networks" Internet Engineering Task Force, Request for comments: 7102, Jan. 2014, pp. 1-8.

CISCO SYSTEMS, INC., "Cisco Connected Grid WPAN Module for CGR 1000 Series Installation and CG-Mesh Configuration Guide", [online], [retrieved on Aug. 27, 2014]. Retrieved from the Internet: <URL: http://www.cisco.com/c/en/us/td/docs/routers/connectedgrid/modules/wpan/release_5-0/Cisco_Connected_Grid_WPAN_Module_for_CGR_1000_Series_installation_and_CG-Mesh_Configuration_Guide.pdf>, pp. 1-46.

Ko et al., "RPL Routing Pathology in a Network With a Mix of Nodes Operating in Storing and Non-Storing Modes", [online], Feb. 12, 2014, [retrieved on Jul. 25, 2014]. Retrieved from the Internet: <URL: http://tools.ietf.org/pdf/draft-ko-roll-mix-network-pathology-04.pdf>, pp. 1-8.

Pei et al., "Fisheye State Routing: A Routing Scheme for Ad Hoc Wireless Networks", [online], Proceedings of the IEEE International Conference on Communications, New Orleans, LA, Jun. 2000, [retrieved on May 15, 2006]. Retrieved from the Internet: <URL: citeseer.ist.psu.edu/article/pei00fisheye.html>, pp. 70-74.

Winter, Ed. et al., "RPL: IPv6 Routing Protocol for Low-Power and Lossy Networks", Internet Engineering Task Force, Request for Comments: 6550, Mar. 2012, pp. 1-157.

Vasseur, Ed. et al., "Routing Metrics Used for Path Calculation in Low-Power and Lossy Networks", Internet Engineering Task Force, Request for Comments: 6551, Mar. 2012, pp. 1-30.

Hui et al., "An IPv6 Routing Header for Source Routes with the Routing Protocol for Low-Power and Lossy Networks (RPL)", Internet Engineering Task Force, Request for Comments: 6554, Mar. 2012, pp. 1-13.

* cited by examiner

DYNAMIC INSTALLATION OF LOCAL STORING MODE PATHS IN A NON-STORING LOW-POWER AND LOSSY NETWORK

TECHNICAL FIELD

The present disclosure generally relates to routing data packets in non-storing mode Low-power and Lossy Networks (LLNs).

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

A Low-power and Lossy Network (LLN) is a network that can include dozens or thousands of low-power router devices configured for routing data packets according to a routing protocol designed for such low power and lossy networks (RPL): such low-power router devices can be referred to as "RPL nodes". Each RPL node in the LLN typically is constrained by processing power, memory, and energy (e.g., battery power); interconnecting links between the RPL nodes typically are constrained by high loss rates, low data rates, and instability with relatively low packet delivery rates. A network topology (a "RPL instance") can be established based on creating routes toward a single "root" network device in the form of a directed acyclic graph (DAG) toward the root network device, also referred to as a "DAG root", where all routes in the LLN terminate at the DAG root.

Downward routes (i.e., away from the DAG root) can be created based on Destination Advertisement Object (DAO) messages that are created by a RPL node and propagated toward the DAG root. The RPL instance implements downward routes in the DAG of the LLN in either a storing mode only (fully stateful), or a non-storing mode only (fully source routed by the DAG root). In storing mode, a RPL node unicasts its DAO message to its parent node, such that RPL nodes store downward routing tables for their "sub-DAG" (the "child" nodes connected to the RPL node). In non-storing mode the RPL nodes do not store downward routing tables, hence a RPL node unicasts its DAO message to the DAG root, such that all data packets are sent to the DAG root and routed downward with source routes inserted by the DAG root.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
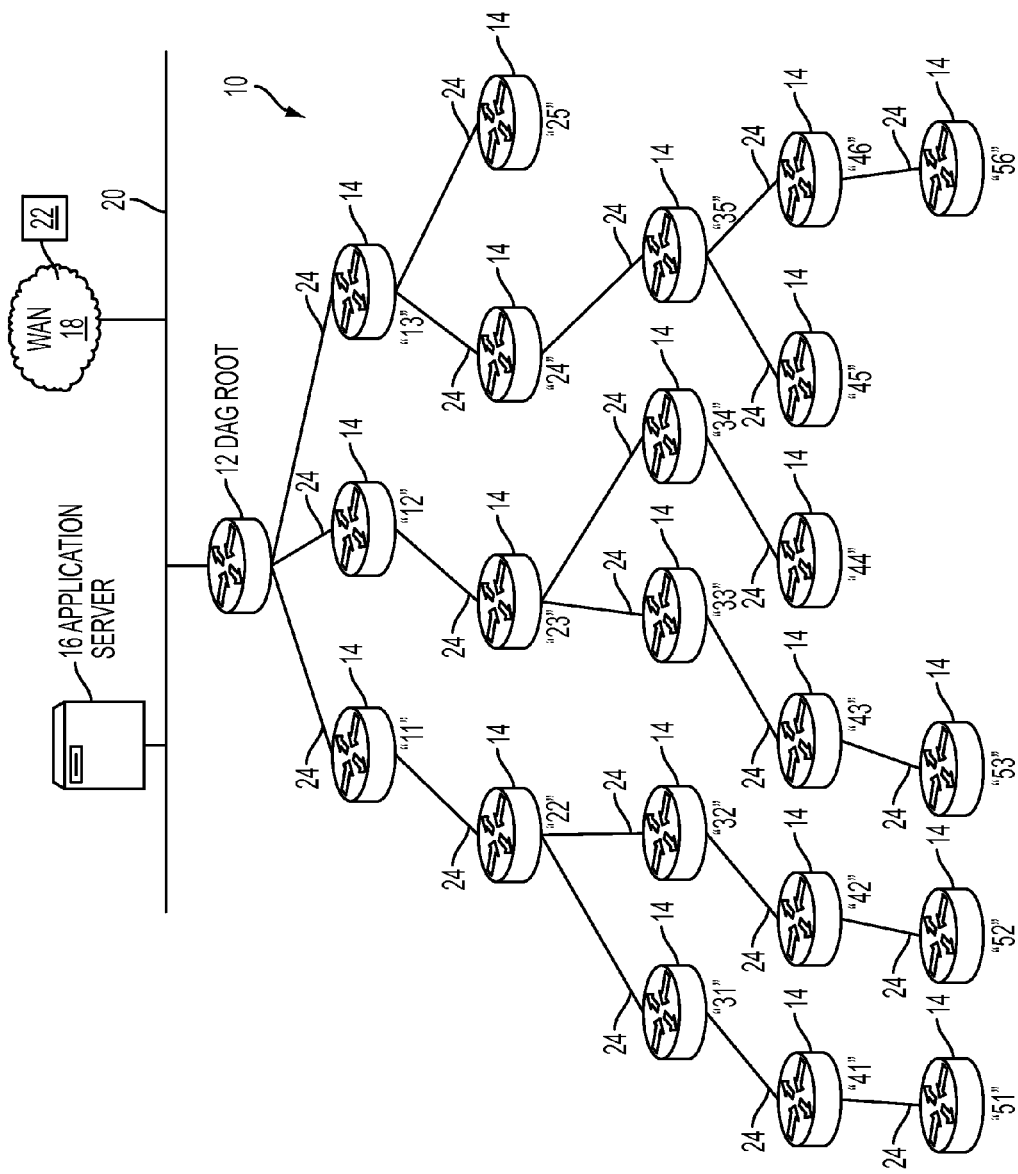
FIG. 1 illustrates an example network having an apparatus operating as a directed acyclic graph (DAG) root and configured for causing installation of a route entry, for reaching a destination device, in one or more parent devices determined as capable of storing the corresponding route entry, according to an example embodiment.

In one embodiment, a method comprises identifying, by a network device operating in a network topology as a directed acyclic graph (DAG) root, a source-route path for reaching a destination device in the network topology; determining whether one or more parent devices along the source-route path between the network device and the destination device are capable of storing a route entry specifying routing information for reaching the destination device; and causing installation of a route entry for reaching the destination device in one or more of the parent devices determined as capable of storing the corresponding route entry.

In another embodiment, an apparatus comprises a device interface circuit and a processor circuit. The device interface circuit is configured for establishing data links with two or more network devices in a network topology, the apparatus operating in the network topology as a directed acyclic graph (DAG) root. The processor circuit is configured for identifying a source-route path for reaching a destination device in the network topology; the processor circuit further is configured for determining whether one or more parent devices along the source-route path between the apparatus and the destination device are capable of storing a route entry specifying routing information for reaching the destination device; the processor circuit further is configured for causing installation of a route entry for reaching the destination device in one or more of the parent devices determined as capable of storing the corresponding route entry.

In another embodiment, logic is encoded in one or more non-transitory tangible media for execution by a machine and when executed by the machine operable for: identifying, by a network device operating in a network topology as a directed acyclic graph (DAG) root, a source-route path for reaching a destination device in the network topology; determining whether one or more parent devices along the source-route path between the network device and the destination device are capable of storing a route entry specifying routing information for reaching the destination device; and causing installation of a route entry for reaching the destination device in one or more of the parent devices determined as capable of storing the corresponding route entry.

DETAILED DESCRIPTION

The Internet Engineering Task Force (IETF) has published a Request for Comments (RFC) 6550 entitled "IPv6 Routing Protocol for Low-Power and Lossy Networks", also referred to as "RPL". Particular embodiments enable a directed acyclic graph (DAG) root in a non-storing mode topology (e.g., a RPL non-storing mode topology according to RFC 6550) to cause installation of localized and temporary storing mode paths in one or more parent devices along an identified source-route path between the network device and a destination device in the non-storing mode topology.

The DAG root can identify an optimized source-route path for reaching the destination device, for example based on receiving unicast DAO messages from RPL nodes identifying child-parent relationships, and recursively identifying child-parent relationships to establish the DAG topology relative to determined capabilities of RPL nodes based on prescribed network management discovery mechanisms or RPL routing extensions as specified in RFC 6551.

The DAG root can cause installation of a route entry for reaching the destination device in one or more parent devices for at least a temporary interval (identified by a specified lifetime interval), based on the DAG root determining that one or more of the parent devices are capable of storing a route entry specifying routing information for reaching the destination device. Depending on the relative capabilities of the parent devices along the source-route path and the flow of traffic to the destination device, the DAG root can cause installation of a route entry in each parent device (eliminating the necessity of any source routing header in any data packet destined for the destination device), or at least one parent between the destination device and a source device sending data packets to the destination device.

Hence, example embodiments enable network traffic in a non-storing topology to be routed to the destination device, via a path distinct from the DAG root, by a common parent capable of storing a route entry for forwarding the network traffic in a downward route toward the destination device based on a stored route entry, enabling the DAG root to be bypassed. The installation of route entries in one or more parent devices capable of storing a corresponding route entry also reduces the necessity of strict source route headers within data packets, enabling the data packet size to be substantially reduced. Since a conventional RPL non-storing mode topology as specified in RFC 6550 would require each and every data packet to be transmitted to the DAG root, the installation of route entries in common parents can dramatically reduce the network traffic encountered by the DAG root, especially in low power and lossy networks having thousands of router devices; moreover, the reduction of packet size by eliminating the necessity of strict source route headers in data packets greatly reduces processing requirements in forwarding the data packets and improves packet delivery rates.

Further, the DAG root can cause installation of a route entry that supplies a source-route path for a segment of one or more parent devices incapable of storing a route entry; hence, a parent device capable of storing the route entry can insert the source-route path for the non-storing mode only segment. Hence, the example embodiments enable a hybrid path to a destination device comprising one or more stateful segments via one or more RPL nodes having respective routing entries for reaching the destination, and one or more non-storing segments via one or more non-storing mode only RPL nodes that rely on source-route header information for forwarding a data packet to a destination.

Hence, the example embodiments can optimize paths for reaching a destination device in a non-storing topology using RPL nodes capable of temporarily storing a route entry, while minimizing the necessary size of the data packets.

FIG. 1 illustrates an example non-storing network topology 10 having a network device 12 operating as a DAG root for multiple network devices 14 operating as RPL nodes, according to an example embodiment. The DAG root 12 can serve as a "sink" for the RPL nodes 14, for example for reaching a server device 16 and/or a wide area network 18 via a backbone link 20. Each network device 14 in the network topology 10 is configured for operating in non-storing mode prior to installation of any route entry by the DAG root 12, described below. Hence, each RPL node 14 can unicast its DAO message to the DAG root 12 in accordance with RFC 6550. The DAG root 12, in response to receiving the DAO messages from the RPL nodes 14, can build the entire DAG topology and store the DAG topology in its memory circuit 44 (illustrated in FIG. 2), including storage of heuristics of usage, path length, knowledge of device capacity, link reliability, etc.

As described in further detail below with respect to FIG. 3, the DAG root 12 can identify data packets destined for a destination device (e.g., "52") from either a source device 14 in the DAG topology 10 (e.g., RPL node "51"), or a source outside the DAG topology 10 (e.g., the server device 16 or a source device 22 transmitting the data packet via the wide area network 18. The DAG root 12 can optimize the path to the destination device (e.g. "52"), for example based on identifying a common parent (e.g., RPL node "22") if the source device 14 is within the DAG topology 10 (e.g., RPL node "51"), or based on selectively causing installation of route entries in one or more parent devices in the source-route path between the DAG root 12 and the destination device (e.g., "52").

Hence, the DAG root 12 can optimize localized routing of network traffic from a source device 14 (e.g., RPL node "51") to the destination device 14 (e.g., RPL node "52") within the DAG topology 10 via a common parent (e.g., "22") device 14 (e.g., via the path "51-41-31-22-32-42-52", eliminating the necessity of a data packet traversing the entire path "51-41-31-22-11 DAG Root-11-22-32-42-52" via the DAG root 12. Similarly, the DAG root 12 can minimize strict source routing for a data packet originating from a source outside the DAG topology 10 based on causing installation of route entries in one or more parent devices (e.g., "11", "22", "32", "42") along the source-route path between the DAG root 12 and the destination device "52", based on the determined capabilities of the parent devices. As described in further detail below with respect to FIG. 4, a source-route path can be installed as a route entry in one of the parent devices to accommodate other parent devices along the path that are incapable of storing a route entry.

Figure 2:
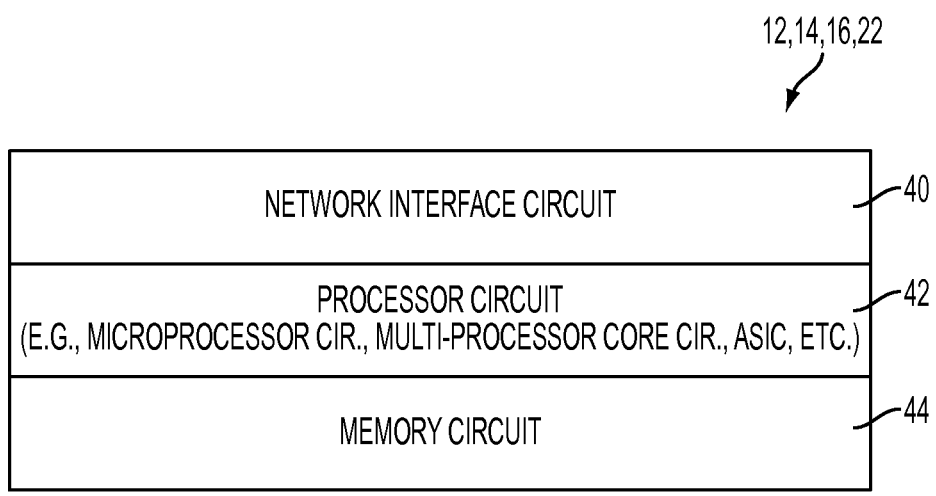
FIG. 2 illustrates an example implementation of any one of the network devices of FIG. 1, including the DAG root, according to an example embodiment.

FIG. 2 illustrates an example implementation of any one of the DAG root 12, an RPL node 14, the server device 16, and/or the network device 22 of FIG. 1, according to an example embodiment. Each apparatus 12, 14, 16, and/or 22 is a physical machine (i.e., a hardware device) configured for implementing network communications with other physical machines via the network 10 and/or 18. The term "configured for" or "configured to" as used herein with respect to a specified operation refers to a device and/or machine that is physically constructed and arranged to perform the specified operation.

Each apparatus 12, 14, 16, and/or 22 can include a device interface circuit 40, a processor circuit 42, and a memory circuit 44. The device interface circuit 40 can include one or more distinct physical layer transceivers for communication with any one of the other devices 12, 14, 16, and/or 22; the device interface circuit 40 also can include an IEEE based Ethernet transceiver for communications with the devices of FIG. 1 via any of the wireless links 24 or wired link 20. The processor circuit 42 can be configured for executing any of the operations described herein, and the memory circuit 44 can be configured for storing any data as described herein, for example route entries, data packets, executable code, etc.

Any of the disclosed circuits of the devices 12, 14, 16, and/or 22 (including the device interface circuit 40, the processor circuit 42, the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 3:
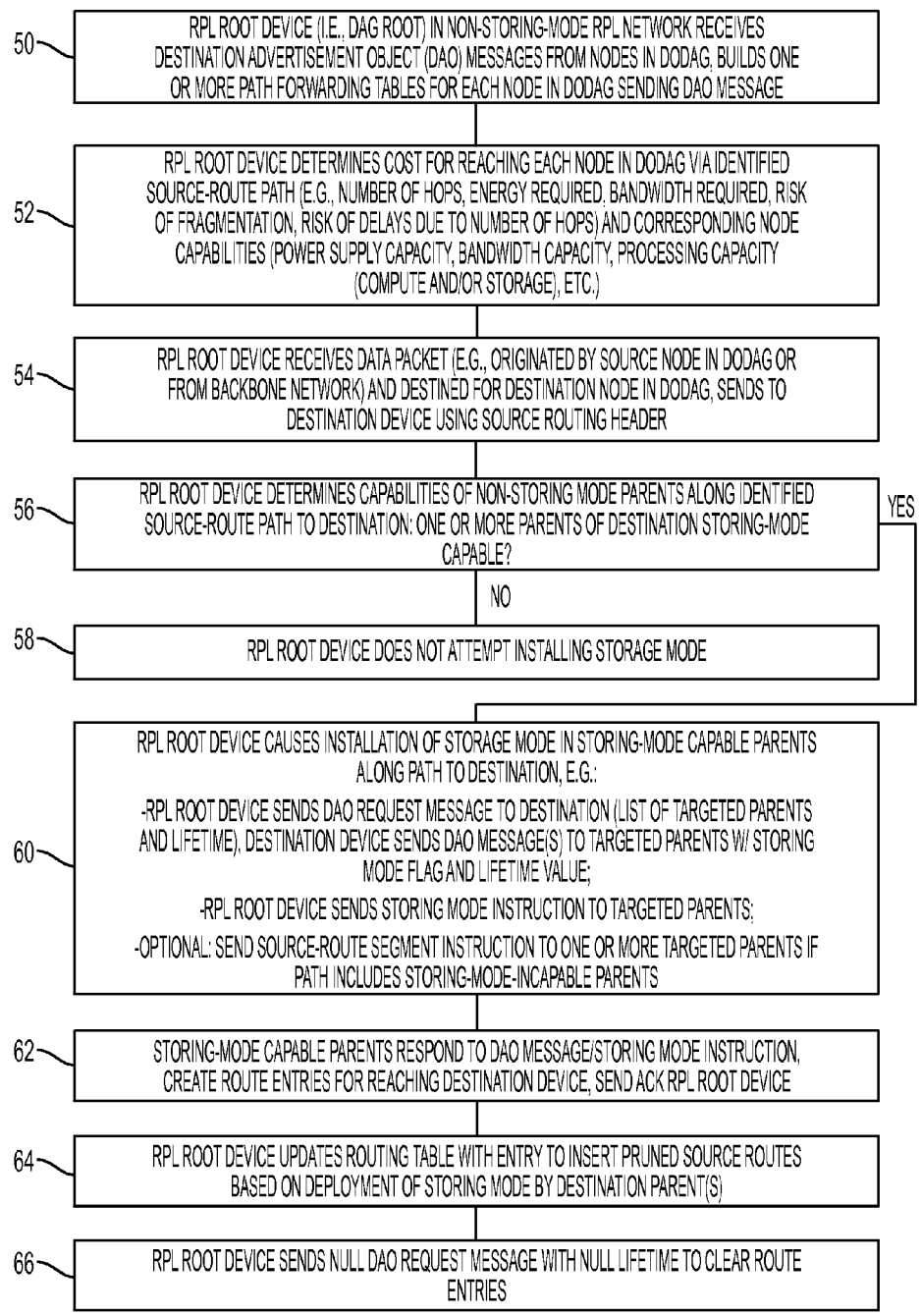
FIG. 3 illustrates an example method of the DAG root causing installation of a route entry in a parent device of a destination device, according to an example embodiment.
Figure 4:
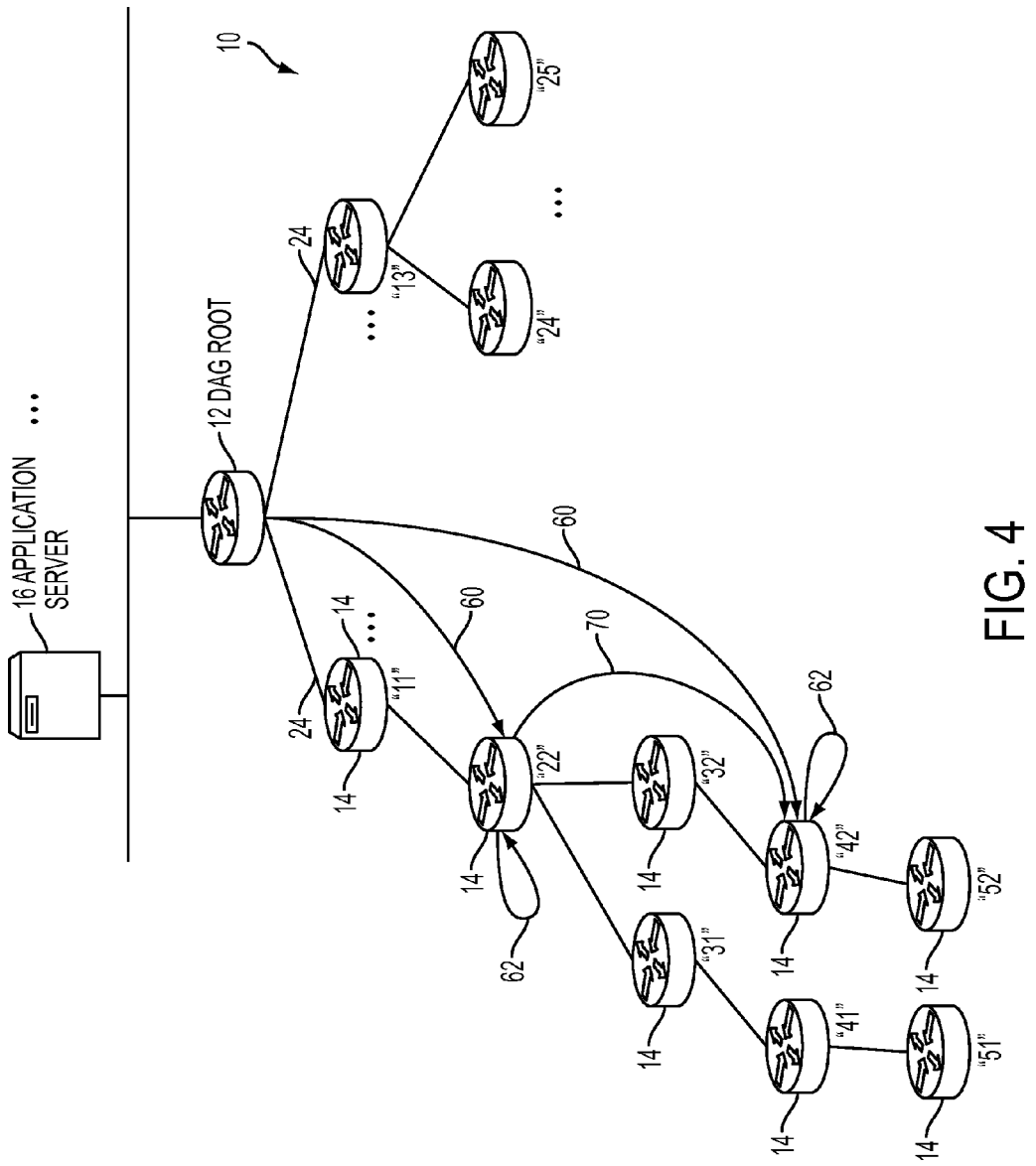
FIG. 4 illustrates an example installation of a source-route path for a segment of one or more parent devices incapable of storing a route entry, according to an example embodiment.

FIG. 3 illustrates an example method of the DAG root 12 causing installation of a route entry in a parent device (e.g., "12") of a destination device (e.g., "52") 14, according to an example embodiment. FIG. 4 illustrates an example installation of a source-route path for a segment of one or more parent devices incapable of storing a route entry, according to an example embodiment. The operations described with respect to any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

In addition, the operations described with respect to any of the FIGS. 1-4 can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

As described herein for purposes of illustration, each RPL node 14 can advertise its own address prefix based on its illustrated identity (e.g., RPL node "42" advertises the IPv6 address prefix "42::/64"), each RPL node 14 can use its own address prefix for claiming an IPv6 address for reachability (e.g., RPL node "42" uses the IPv6 address "42::01" and RPL node "52" uses the IPv6 address "52::01"), and each RPL node can used an attachment address based on its illustrated identity (e.g., RPL node "52" attaches to RPL node "42" using the attachment address "42::52").

Referring to FIG. 3, the device interface circuit 40 of the DAG root 12 in operation 50 receives DAO messages from the RPL nodes 14 in the DAG topology 10. For example, the RPL node "52" 14, in response to attaching to the RPL node "42" (advertising the IPv6 address "42::/62") at the attachment address of "42::52", can unicast to the DAG root 12 a DAO message specifying that the IPv6 address of the RPL node "52" (e.g., "52::01") is reachable via the attachment address "42::01" within the address prefix "42::/64" advertised by the RPL node "42" 14.

In response to reception of the DAO messages, the processor circuit 42 of the DAG root 12 stores the parent-child relationships specified in the DAO messages in the memory circuit 44 of the DAG root 12, and builds one or more path forwarding tables for each RPL node 14 that sends a corresponding DAO message.

The processor circuit 42 of the DAG root 12 in operation 52 can identify one or more source-route paths for reaching each RPL node 14 as a destination device in the network topology 10, and determine a corresponding cost for reaching each node in the DAG topology via the identified source-route path. Example costs for reaching each node can be based on the number of hops from the DAG root 12 to the destination device (e.g. "52") 14 via its parent devices (e.g., "11", "22", "32", and "42"), the amount of energy required via the wireless links 24, the bandwidth required for a given type of data traffic (e.g., low bandwidth for status messages, higher bandwidth for streaming media, etc.), risk of fragmentation, risk of delays due to number of hops or network congestion, etc. Other examples of costs for reaching each node can be based on the corresponding node capabilities of each parent device along the path to the destination device relative to encountered traffic, including power supply capacity, bandwidth capacity, processing capacity including compute and/or storage capacity, etc. Hence, the processor circuit 42 of the DAG root 12 can precisely determine the multivariable costs for reaching a RPL node 14 as a destination device based on current network statistics including topological characteristics, environmental variables, network device capacity, network device status, etc.

The processor circuit 42 of the DAG root in operation 52 can store the one or more source-route paths and associated costs for each RPL node 14, for example as one or more routing entries in the memory circuit 44. If a given RPL node 14 has more than one source-route path (e.g., the RPL node 14 has attached to plural parent nodes), the processor circuit 42 also can identify optimum paths on a per-hop basis among the plural source-route paths. In one example, a source RPL node "51" 14 sending data packets to a destination RPL node "52" could have an attachment link (not shown) to an additional parent node (e.g., "32") 14 in addition to the existing attachment link to parent node "41" illustrated in FIGS. 1 and 4; hence, the processor circuit 42 of the DAG root could install an additional downward route for the additional common parent "32", such that both common parents "22" and "32" have downward routes for reaching the destination node "52". Further following this example, in one embodiment the processor circuit 42 of DAG root 12 also could install an upward route in source node "51" to use that common parent "32" for reaching the destination node "52", bypassing the DAG root 12, the common parent "11", and the common parent "22". Hence, the processor circuit 42 of the DAG root 12 can be configured for adding upward route information in Destination Oriented DAGs (DODAGs) within the topology 10 for optimizing upward traffic toward a common parent 14, as well as downward routes toward a destination.

Hence, the processor circuit 42 of the DAG root 12 can create an optimized source-route path along any segment of the DAG topology 10 based on determined conditions between a source network device and a destination device, and optionally add an upward route within a DODAG topology toward a common parent to further optimize localized communications within the DAG topology 10.

The device interface circuit 40 in operation 54 can receive one or more data packets originated by a source RPL node 14 in the RPL network 10 (e.g., "51"), or from a source device (e.g., device 22) via the backbone network 20, that is destined for the destination device (e.g., "52") at the example IPv6 address of "52::01". The processor circuit 42 in operation 54 responds to the data packet by sending the data packet to the destination device using a source routing header.

In response to receiving the one or more data packets destined for the destination device (e.g., "52") 14, the processor circuit 42 in operation 56 also can execute different heuristics (e.g., deep packet inspection, etc.) to determine whether a route entry should be installed in a parent device 14 (e.g., "22") for the network traffic reaching the destination device (e.g., "52"). For example, the processor circuit 42 can determine that installation of a route entry is preferred for an identifiable localized application executed within the network topology 10, or based on determining the relative network traffic between the source and destination exceeds a determined threshold.

The processor circuit 42 of the DAG root 12 in operation 56 can determine whether one or more of the parent devices 14 along the source-route path between the DAG root 12 and the destination device (e.g., "52") 14 are capable of storing a route entry specifying routing information for reaching the destination device (e.g., "52") 14. As described previously, the processor circuit 42 can access the capabilities of each of the parent devices (e.g., "11", "22", "32", and "42") 14 from the associated entries in the memory circuit 14 specifying the compute and/or storage capacity of each of the parent devices 14; alternatively, the processor 42 can obtain updated capabilities information based on receiving updated status messages (e.g., DAO messages) unicast from the parent devices 14 operating in non-storing mode. If in operation 56 the processor circuit 42 determines that none of the parent devices (e.g., "11", "22", "32", or "42") 14 of the destination device (e.g., "52") 14 are storing-mode capable, the processor circuit 42 causes the device interface circuit 42 send the data packet to the destination "52" using a strict source routing header in operation 58.

If in operation 56 the processor circuit 42 determines that one or more of the parent devices (e.g., "11", "22", "32", and "42") 14 of the destination device (e.g., "52") 14 are storing-mode capable, the processor circuit 42 in operation 60 can cause installation of a route entry, for reaching the destination device 14, in one or more of the parent devices 14 determined as capable of storing the corresponding route entry. In one example, the processor circuit 42 of the DAG root 12 can send a unicast message to the destination device (e.g., "52") 14 instructing the destination device (e.g., "52") 14 to output a DAO request forcing installation of a corresponding route entry in one or more of the parent devices for a specified lifetime interval. For example, the processor circuit 42 of the DAG root 12 can instruct the destination device (e.g., "52") 14 to output a DAO request specifying, for each storing-mode capable parent device, a "force" bit (i.e., storing mode flag) that requires the targeted non-storing parent device to create a storing state for a specified lifetime interval value, plus the route to be stored; hence, the processor circuit 42 of the DAG root 12 can specify, in one or more unicast messages to the destination device (e.g., "52") 14, the following route entries: a route entry targeted for the parent device "22" 14 (at IPv6 address "22::01") specifying that the destination device "52" at the destination IPv6 address "52::01" (or at least its address prefix "52::/64") is reachable via the IPv6 address "22::32" with a lifetime of five minutes; a route entry targeted for the parent device "32" 14 (at IPv6 address "32::01") specifying that the destination device "52" at the destination IPv6 address "52::01" (or at least its address prefix "52::/64") is reachable via the IPv6 address "32::42" with a lifetime of five minutes; and a route entry targeted for the parent device "42" 14 (at IPv6 address "42::01") specifying that the destination device "52" at the destination IPv6 address "52::01" (or at least its address prefix "52::/64") is reachable via the IPv6 attachment address "42::52" with a lifetime of five minutes. In response to the destination device "52" receiving the DAO request from the DAG root 12, the destination device "52" can output one or more DAO request messages to the parent devices "42", "32", and "22" forcing installation of the corresponding routing entry for the specified lifetime interval; in one embodiment, the destination device "52" can unicast individual DAO request messages to each parent device "42", "32", and "22" specifying the "force" bit, the corresponding routing entry, and a specified lifetime interval; in another embodiment, the destination device "52" can unicast a single DAO request message to the parent device "42" that specifies the routing entries for the parent devices "42", "32", and "22" as a sequence of option fields within the single DAO request message, such that the parent device "42" installs its corresponding route and forwards the DAO request message to the parent device "32", which installs its corresponding route and forwards the DAO request message to the parent device "22", which installs its corresponding route.

In another example, the processor circuit 42 of the DAG root 12 can send its own unicast message to one or more of the parent devices "22", "32", and/or "42" instructing installation of the corresponding route entry for a specified lifetime interval. Hence, regardless of whether the unicast message is sent by the DAG root 12 or the destination device "52", the parent device "22" in operation 62 can respond to the DAO request message by installing a route specifying that the destination device "52" at the destination IPv6 address "52::01" is reachable via the IPv6 address "22::32" with a lifetime of five minutes, and/or that the address prefix "52::/64" is reachable via "22::32"; the parent device "32" can respond to the DAO request message in operation 62 by installing a route specifying that the destination device "52" at the destination IPv6 address "52::01" is reachable via the IPv6 address "32::42" with a lifetime of five minutes, and/or that the address prefix "52::/64" is reachable via "32::42"; the parent device "42" 14 can respond to the DAO request message in operation 62 by installing a route specifying that the destination device "52" at the destination IPv6 address "52::01" is reachable via the IPv6 attachment address "42::52" with a lifetime of five minutes, and/or that the address prefix "52::/64" is reachable via "42::52". Each parent device "22", "32", and "42" also can output in operation 62 an acknowledgement to the DAG root 12, enabling the DAG root 12 to update in operation 64 its routing tables to "prune" its strict source-route entry for the destination device "52" into a "pruned" route entry, for example specifying that IPv6 address "52::01" and/or the IPv6 address prefix "52::/64" are reachable via the source route "DA::11"-"11::22", where "DA::11" is the attachment address of the RPL node "11" and "11:22" is the attachment address of the RPL node "22". Hence, the RPL node "22", in response to receiving a data packet destined for the IPv6 address "52::01", can forward the data packet along the downward route toward the destination device "52" via the next-hop address "22::32" based on the stored route entry.

Hence, the storage of route entries enables a data packet from the source node "51" destined for the destination device "52" at IPv6 address "52::01" to be routed by the common parent "22" downward via the next-hop address "22::32", without the necessity of any source routing header. Hence, localized optimization can be implemented on a temporary basis, as needed for application-specific operations between the RPL nodes "51" and "52". The DAG root 12 also can output in operation 66 a unicast NULL DAO request message to any of the RPL nodes 14 specifying a Null lifetime value to cause any of the RPL nodes 14 to clear the route entries.

Instances may arise where the DAG root 12 can continue to receive data packets from the RPL node "51" destined for the destination RPL node "52" while the route installation is pending in operations 60 and 62. Hence, the processor circuit 42 of the DAG root 12 can initiate a localized route installation timer for each targeted parent having been sent a storing mode instruction: if a data packet is received during the route installation interval, the processor circuit 42 of the DAG root can suppress repeating operation 60 and forward the data packet using source routing; if the data packet is received after expiration of the route installation interval (e.g., after the expected ACK from the targeted parent), the processor circuit 42 of the DAG root can either repeat operation 60 for the targeted parent in another attempt to install the route, or after repeated attempts reclassify the targeted parent as non-storing mode capable.

FIG. 4 illustrates a variation of operation 60, where the processor circuit 42 of the DAG root 12 can be configured for causing the parent device "22" to store a source-route path for a segment 70 including the parent device "32", based on the processor circuit 42 of the DAG root 12 determining in operation 56 that the parent device "32" is incapable of storing a route entry. Hence, the processor circuit 42 of the DAG root 12 can send a source-route segment instruction to the targeted parent device "22" specifying that the IPv6 address "52::01" (or the IPv6 address prefix "52::/64") is reachable via the source route path "22::32"-"32::42". Hence, the parent device "22" in operation 62 can install the route entry specifying the source-route path for the segment 70. The installed route entry enables the parent device "22" to insert the source route path "22::32"-"32::42" for the segment 70 into any data packet destined for the destination device "52"; in response to the non-storing mode parent device "32" receiving the data packet specifying the source route path "22::32"-"32::42", the parent device "32" can strip off its attachment address "22::32" and forward the data packet to the specified address "32::42". The parent device "42", having installed in operation 62 a route entry for reaching the destination device "52", can forward the data packet to the destination device "52" via the attachment address "42::52" specified in its route entry.

According to example embodiments, a DAG root 12 in a non-storing RPL topology can cause installation of one or more route entries in parent devices determined to be capable of storing a route entry for reaching a destination device. The route entries in the parent devices can be stored on a temporary basis based on a specified lifetime interval set by the DAG root, or based on the DAG root outputting an instruction to one or more of the RPL devices to cause the route entry to be removed. The example embodiments can provide localized optimization of routing traffic flows within the RPL network topology, and can improve efficiency in the RPL network topology by reducing the necessity of strict source routes.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   identifying, by a network device operating in a network topology as a directed acyclic graph (DAG) root, a source-route path for reaching a destination device in the network topology;
   determining whether one or more parent devices along the source-route path between the network device and the destination device are capable of storing a temporary route entry specifying routing information for reaching the destination device for a temporary interval; and
   causing installation of a temporary route entry for reaching the destination device in one or more of the parent devices determined as capable of storing the corresponding temporary route entry.

2. The method of claim 1, wherein the identifying is in response to the network device receiving a data packet, destined for the destination device, via one of a source device in the DAG or a source outside the DAG.

3. The method of claim 1, wherein the causing is based on at least one of:
   sending a first unicast message to the one or more of the parent devices instructing installation of the corresponding temporary route entry for a specified lifetime interval equal to the temporary interval; or sending a second unicast message to the destination device instructing the destination device to output a request forcing installation of the corresponding temporary route entry in the one or more of the parent devices for a specified lifetime interval equal to the temporary interval.

4. The method of claim 1, further comprising the network device causing the temporary route entry to be removed from the one or more parent devices upon expiration of the temporary interval.

5. The method of claim 1, wherein the temporary route entry specifies a source-route path for a segment of one or more of the parent devices incapable of storing a route entry, enabling the one parent device to insert the source-route path for use by the one or more parent devices incapable of storing a route entry.

6. The method of claim 1, further comprising the network device pruning a stored source-route path for reaching the destination based on the installation of the temporary route entry in the one or more parent devices.

7. The method of claim 1, wherein the identifying includes identifying, from among at least first and second source-route paths for a source device to reach the destination device via the DAG root, the first source-route path as an optimized source-route path, the temporary route entry causing temporary routing along at least a part of the optimized source-route path and bypassing the second source-route path.

8. The method of claim 7, wherein:
the first source-route path identifies a first parent device between the source device and the DAG root and the second source-route path identifies a second parent device between the source device and the DAG root;
the temporary route entry including upward route information causing data from the source device to be routed toward the DAG root along the optimized source-route path via the first parent device, and bypassing the second parent device.

9. An apparatus comprising:
a device interface circuit configured for establishing data links with two or more network devices in a network topology, the apparatus operating in the network topology as a directed acyclic graph (DAG) root; and
a processor circuit configured for identifying a source-route path for reaching a destination device in the network topology, the processor circuit further configured for determining whether one or more parent devices along the source-route path between the apparatus and the destination device are capable of storing a temporary route entry specifying routing information for reaching the destination device for a temporary interval, the processor circuit further configured for causing installation of a temporary route entry for reaching the destination device in one or more of the parent devices determined as capable of storing the corresponding temporary route entry.

10. The apparatus of claim 9, wherein the processor circuit is configured for identifying the source-route path in response to the device interface circuit receiving a data packet, destined for the destination device, via one of a source device in the DAG or a source outside the DAG.

11. The apparatus of claim 9, wherein the processor circuit is configured for causing installation of the temporary route entry based on at least one of:
sending a first unicast message to the one or more of the parent devices instructing installation of the corresponding temporary route entry for a specified lifetime interval equal to the temporary interval; or
sending a second unicast message to the destination device instructing the destination device to output a request forcing installation of the corresponding temporary route entry in the one or more of the parent devices for a specified lifetime interval equal to the temporary interval.

12. The apparatus of claim 9, wherein the processor circuit is configured for causing the temporary route entry to be removed from the one or more parent devices upon expiration of the temporary interval.

13. The apparatus of claim 9, wherein the temporary route entry specifies a source-route path for a segment of one or more of the parent devices incapable of storing a route entry, enabling the one parent device to insert the source-route path for use by the parent devices incapable of storing a route entry.

14. The apparatus of claim 9, further comprising a memory circuit configured for storing the source-route path for reaching the destination device, the processor circuit configured for pruning the source-route path stored in the memory circuit based on the installation of the route entry in the one or more parent devices.

15. The apparatus of claim 9, wherein the processor circuit is configured for identifying, from among at least first and second source-route paths for a source device to reach the destination device via the DAG root, the first source-route path as an optimized source-route path, the temporary route entry causing temporary routing along at least a part of the optimized source-route path and bypassing the second source-route path.

16. The apparatus of claim 15, wherein:
the first source-route path identifies a first parent device between the source device and the DAG root and the second source-route path identifies a second parent device between the source device and the DAG root;
the temporary route entry including upward route information causing data from the source device to be routed toward the DAG root along the optimized source-route path via the first parent device, and bypassing the second parent device.

17. Logic encoded in one or more non-transitory tangible media for execution by a machine and when executed by the machine operable for:
identifying, by a network device operating in a network topology as a directed acyclic graph (DAG) root, a source-route path for reaching a destination device in the network topology;
determining whether one or more parent devices along the source-route path between the network device and the destination device are capable of storing a temporary route entry specifying routing information for reaching the destination device for a temporary interval; and
causing installation of a temporary route entry for reaching the destination device in one or more of the parent devices determined as capable of storing the corresponding temporary route entry.

18. The logic of claim 17, wherein the temporary route entry specifies a source-route path for a segment of one or more of the parent devices incapable of storing a route entry, enabling the one parent device to insert the source-route path for use by the one or more parent devices incapable of storing a route entry.

19. The logic of claim 17, wherein the causing is based on at least one of:

sending a first unicast message to the one or more of the parent devices instructing installation of the corresponding temporary route entry for a specified lifetime interval equal to the temporary interval; or sending a second unicast message to the destination device instructing the destination device to output a request forcing installation of the corresponding temporary route entry in the one or more of the parent devices for a specified lifetime interval equal to the temporary interval.

20. The logic of claim 17, wherein:

the identifying includes identifying, from among at least first and second source-route paths for a source device to reach the destination device via the DAG root, the first source-route path as an optimized source-route path, the temporary route entry causing temporary routing along at least a part of the optimized source-route path and bypassing the second source-route path;

the first source-route path identifies a first parent device between the source device and the DAG root and the second source-route path identifies a second parent device between the source device and the DAG root; and the temporary route entry including upward route information causing data from the source device to be routed toward the DAG root along the optimized source-route path via the first parent device, and bypassing the second parent device.

* * * * *